Aug. 2, 1927.

C. AALBORG 1,637,328

ELECTRODE FOR ELECTROLYTIC CONDENSERS

Filed Oct. 23, 1920

WITNESSES:

INVENTOR
Christian Aalborg
BY
Wesley G. Carr
ATTORNEY

Patented Aug. 2, 1927.

1,637,328

UNITED STATES PATENT OFFICE.

CHRISTIAN AALBORG, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRODE FOR ELECTROLYTIC CONDENSERS.

Application filed October 23, 1920. Serial No. 419,025.

This invention relates to electrodes, more especially to electrodes adapted for use in electrolytic condensers, lightning arresters, rectifiers, etc.

Electrodes for the above-named purposes should combine a large surface area with a small space to present a maximum area for contact with the electrolyte in a minimum space, to render such apparatus efficient. In order to accomplish this, there had been proposed an electrode which was composed of a crimped or corrugated strip or plate of thin sheet metal mounted on a suitable supporting frame. To hold the corrugated strip securely to the frame, the upper and lower edges thereof were grooved across the corrugations to receive the upper and lower members of the supporting frame.

It was very difficult to cut these grooves without bending or destroying the corrugations or otherwise distorting the plate. To remedy this, it was proposed to cast fusible metal around the ends of the corrugated plate, cut the grooves, and then melt away the fusible metal. This procedure involved considerable labor and expense and was not always successful. An electrode made in this manner did not allow free circulation of electrolyte, even though slits were cut at the folds.

The present invention obviates these difficulties, it being among the objects thereof to devise an electrode which will present a maximum surface within a minimum of space, be simple in construction and easy to manufacture, which will allow ready circulation of electrolyte and which will be rigid and strong.

In practising my invention, I utilize a sheet of metal which is cut or slit in a peculiar manner in order to form sections, which are then so folded as to produce the completed electrode. Spacing means are provided between the sections to render the completed electrode of open-work construction to allow free circulation of electrolyte and to prevent short-circuiting.

In the accompanying drawings forming a part hereof and which illustrate several embodiments of my invention, Fig. 1 is a plan view showing a sheet of metal cut and ready to fold;

Figure 1:
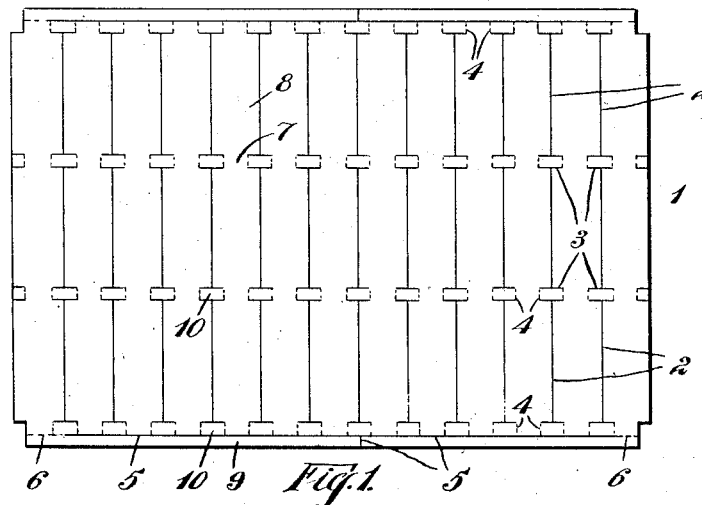
Figures 2, 3:
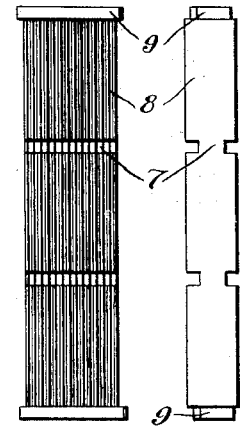
Fig. 2 is a side view of an electrode cut and folded in accordance with the pattern of Fig. 1.
Fig. 3 is an end view of the electrode shown in Fig. 2.
Figure 5:
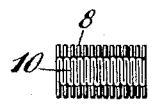
Fig. 5 is a similar view of a slightly modified form of electrode.

A sheet of thin metal 1 is cut longitudinally and transversely along lines 2 and 3, respectively, as shown in Fig. 1, leaving connecting portions 4 about which the cut portions are to be folded. Cuts 5 are made along both the top and bottom edges of sheet 1 to form strips held to the sheet by portions 6. The sheet thus cut provides body portions 7, wings 8, stiffening means 9, and spacing members 10.

Figure 4:
Fig. 4 is a top view of the electrode.
Figure 6:
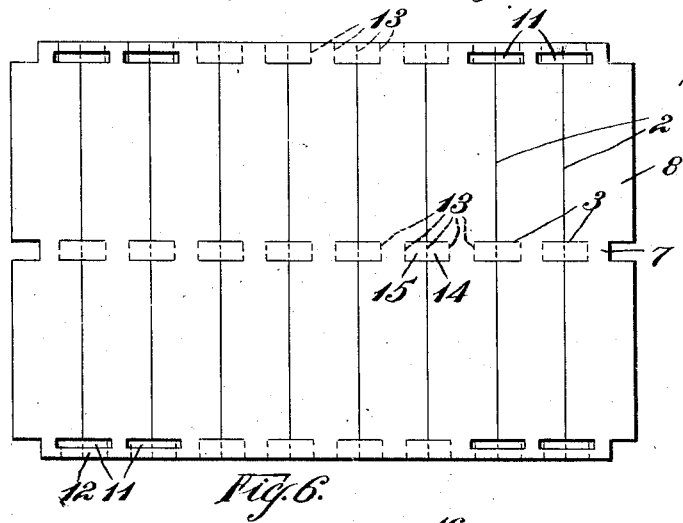
Fig. 6 is a plan view of a sheet of metal cut to a slightly different pattern from Fig. 1.
Figures 7, 8:
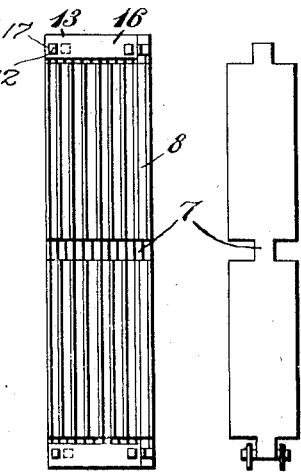
Fig. 7 is a side view of the electrode, the pattern of which is shown in Fig. 6.
Fig. 8 is an end view of the same, some parts being shown slightly exaggerated.

The sheet is then folded along lines 4 so that the corresponding faces of adjacent sections are folded adjacent each other, forming a structure such as shown in Figs. 2 to 5 in which each section 8 is separated from the next by a single intermediate spacing member 10. The stiffening members 9 are folded about the ends of the folded electrode and welded or otherwise secured in position, as shown in Fig. 4. In the embodiment shown in Fig. 5, the stiffening strips 9 have been omitted but, otherwise, the structure is the same as that shown in Figs. 1 to 4. Any suitable stiffening and holding means may be substituted for strips 9.

In the form of the invention shown in Figs. 6 to 10, the sheet metal plate is cut vertically and horizontally along lines 2 and 3, respectively, in a manner similar to that described above, forming body and wing portions. At intervals along the top and bottom edges of the strip, openings 11 are cut providing portions 12 adapted to be folded to form projecting members which constitute clamping and stiffening means for the electrode.

Figure 10:
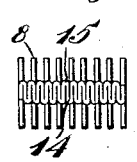
Fig. 10 is a similar view of a slightly modified form of electrode.
Figure 9:
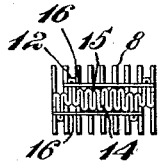
Fig. 9 is a top view thereof.

The strip so cut is folded along dotted lines 13 (Fig. 6) so that the face of one section is placed opposite to the corresponding face of the next section with two intermediate spacing members 14 and 15 interposed therebetween. Portions 12 project outwardly from the top and bottom of the folded electrode, and strips 16, having apertures 17 through which portions 12 are threaded, are placed thereover, and the projecting portions 12 hammered down over apertures 17 to fix strips 16 permanently in place. The modified form shown in Fig. 10 shows an electrode similar to that of Fig. 9 but omitting the special stiffening and clamping means there shown.

It will be seen that, by providing a strip of thin sheet metal, cutting the same to a predetermined pattern, and then folding to form the finished electrode, I have, in a very simple manner, produced a structure which has a large surface area within a very small space and which is simple in construction and easy to manufacture. On account of the spacing members, which may be of any desired number, the various sections of the electrode are spaced any desired distance apart, thus allowing free circulation of electrolyte between the various sections. By providing clamping means integral with the electrode, I am enabled to securely fasten the parts of the electrode rigidly together, avoiding the necessity of providing additional and complicated clamping and stiffening means.

Although I have shown and described several embodiments of my invention, it is to be understood that my invention is not limited by the details shown. For instance, I may omit the special stiffening and clamping means described and substitute therefor other more commonly used means. Instead of one or two spacing members between adjacent sections of the electrode, I may provide a different number in accordance with the requirements in any special case.

I may change the relative sizes and shapes of the various parts of my electrode. For example, the body portion 7 and wings 8 may be of approximately the same size or the body portion 7 may be of very small area compared to the wings 8, and any number of such alternate wing and body portions may be formed on each section of my electrode. The cuts 2 and 3 may be of any suitable form, such as slits or openings of greater or less width.

I claim as my invention:

1. An electrode comprising folded sheet metal having slits therein providing wings and body portions, and stiffening means formed integrally with said sheet.

2. An electrode comprising folded sheet metal having slits therein providing wings and body portions, and stiffening strips formed on the ends of said sheet and holding the several folds in relatively fixed position.

3. An electrode comprising a piece of sheet metal having portions folded back and forth to form closely disposed layers, less than all of said layers having substantially coplanar extending portions, whereby adjacent extending portions are spaced by one or more layers having no coplanar extending portions.

4. An electrode comprising an integral piece of sheet metal having a plurality of slits extending in a general cross-wise direction and a plurality of connecting slits extending in a general length-wise direction, some of said slits being so aligned as to provide relatively narrow portions, said relatively narrow portions being folded back and forth to form closely disposed layers, less than all of said layers having substantially coplanar integral extending portions.

5. A sheet-metal electrode comprising a stack of spaced sheet members and a plurality of integral folded portions joining the same, said folded portions being disposed in a plurality of piles of relatively closely disposed layers, and said spaced sheet members being more widely spaced from each other than the spacings between said folded portions.

In testimony whereof, I have hereunto subscribed my name this 13th day of October, 1920.

CHRISTIAN AALBORG.